Jan. 17, 1933.  H. L. CROWLEY  1,894,368
METHOD OF MOLDING CERAMIC MATERIALS
Filed April 9, 1931
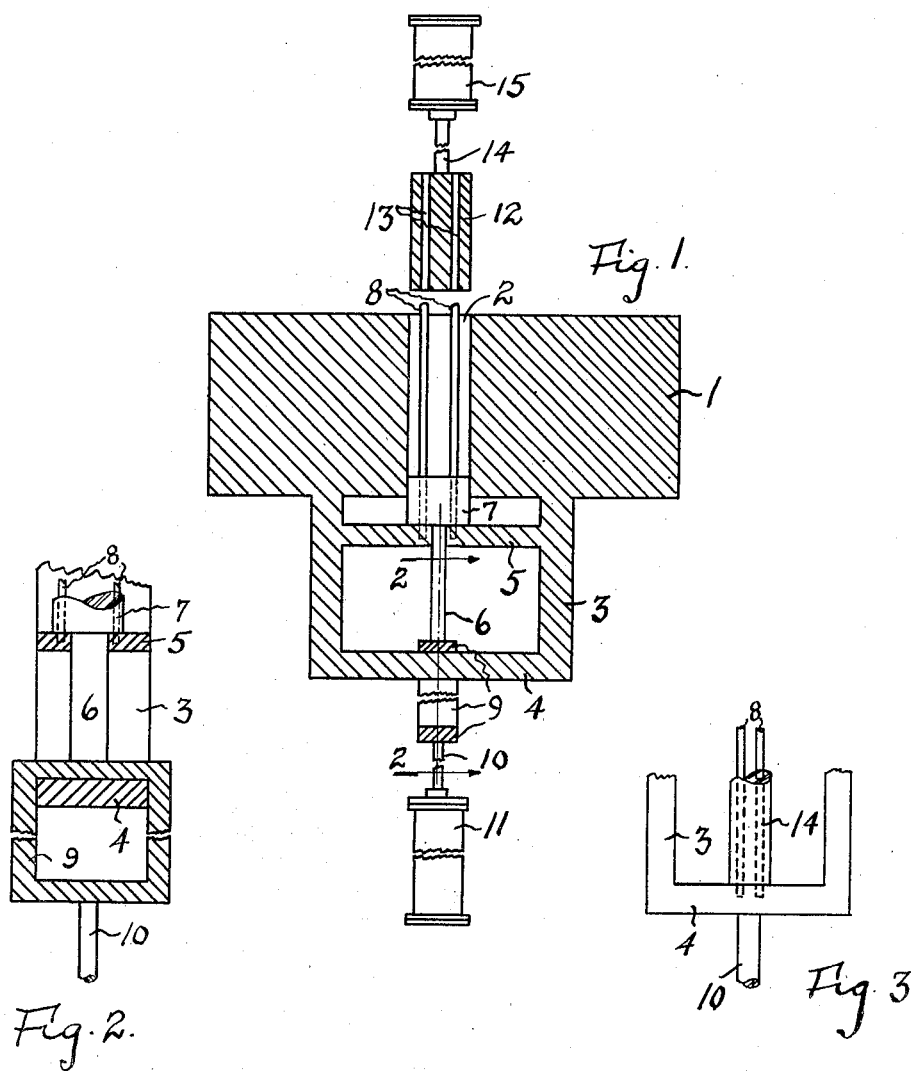
INVENTOR
Henry L. Crowley
BY Darby & Darby
ATTORNEYS Patented Jan. 17, 1933

1,894,368

UNITED STATES PATENT OFFICE

HENRY L. CROWLEY, OF WEST ORANGE, NEW JERSEY, ASSIGNOR TO HENRY L. CROWLEY & COMPANY, INC., OF WEST ORANGE, NEW JERSEY, A CORPORATION OF NEW JERSEY

METHOD OF MOLDING CERAMIC MATERIALS

Application filed April 9, 1931. Serial No. 528,732.

This invention relates in general to methods of molding under pressure granular or powdered ceramic materials to form self-sustaining bodies.

One of the objects of this invention involves a novel method of preparing and molding granular and powdered materials to form self-sustaining bodies which may be heat treated if desired.

Another object of this invention involves a production of ceramic refractory bodies which are relatively soft so that the bodies may be ground, machined and similarly processed.

These and other objects as will appear from the following disclosure are secured by means of this invention.

This invention resided substantially in the steps and series of steps of the method as will be described below.

Referring to the drawing:

Figure 1 is a vertical sectional view through one form of the molding apparatus;

Fig. 2 is a cross-sectional view taken on the line 2—2 of Fig. 1;

Fig. 3 is a detailed view of a modified part of the molding apparatus;

This application is a continuation in part of my copending application Serial No. 473,381 filed August 6, 1930. The molding apparatus disclosed in this application may be used in molding the materials produced by the process of my copending application Serial No. 332,555 filed January 14, 1929. The apparatus of this case may be employed for making ceramic cathode supports such as disclosed in my copending application Serial No. 370,789 filed June 14, 1929.

The materials to be molded are prepared in the following manner. They may be selected in accordance with the requirements of the finished product along the lines set forth in my copending application Serial No. 332,555. In general the process relates to the molding of powdered or granular materials. An example of the material which may be used is magnesia oxide prepared in any known manner or precipitated magnesia. The magnesia oxide and talc are placed in a mixer with an agglomerant such as carbohydrate of the sugar or starch type preferably containing an appreciable quantity of water. This mixture is thoroughly mixed in any suitable form of mechanical mixer so that the powders are thoroughly wetted and the material is formed into small balls or granules. These balls or granules are then passed through a coarse mesh screen and the screened mixture is then partially dried and then passed through a No. 12 screen or a somewhat finer meshed screen. The screened material is then dried to substantially bone dryness.

In a modified and sometimes preferable process these materials are mixed in a vacuum which enables the small particles to ball up or granulate without the entrainment of air. Such a material molds under pressure or by extrusion more easily. If desired a dehydrate of the non-crystalline fat type such as stearic acid can be mixed with the dried powder to make it a relatively free, fine powder. Introduction of the talc into the mixture results in a product which is softer and which does not vitrify so intensely when heat treated. Since a material molded from such a powder when in use under high temperature conditions tends to shrink considerably it is found that in these cases the powdered material such as the magnesia oxide is pre-fired before it is mixed with the other ingredients.

In place of the talc and particularly where the powder is to be extruded under pressure it has been found that the use of a low melting binder, such as lead borate or lead acetate or a mixture of the two, produces a ceramic product when fired which is relatively cheap in manufacture. The addition of these materials particularly adapts the mixture to extrusion so that products can be very cheaply produced therefrom. A suitable binder of low melting temperature is cuprous chloride which fuses at about 425° F. Furthermore, the use of the low melting binder permits of relatively rapid heat treatment and articles made therefrom are adapted to a continuous heat treating process using a belt for carrying them through the furnace. Since the firing is a considerable element of the cost, a reduction in firing time by the use of a low melting binder results in a considerable saving. Likewise a relatively lower firing temperature may be used say of the order of 1000° C. or less. When the low temperature binder is used the carbohydrate agglomerant or any other carbonaceous binder cannot be used since it will not be burnt out of the finished product. Hence the mixture would then consist of magnesia oxide or its equivalent and talc. Such low temperature fired ceramic bodies are desirable for many uses, are less brittle, and have good mechanical strength. However, in use they are limited to temperature conditions which do not materially exceed 400 to 500° F.

Referring now to the apparatus by means of which these materials may be molded. At 1 is shown a heavy block provided with a recess 2 of the shape which it is desired that the finished product have. At 3 and 4 are arms integral with the plate 1 to form a guide for the moving parts. These arms are crosspressed by a bar 5 integral therewith. At 7 is a close fitting piston which forms the bottom of recess 2. This piston when raised on the cross arm 5 projects into the recess 2 sealing it at the lower end. Piston 7 is connected by piston rod 6 to a framework 9 which in turn is connected by piston rod 10 to the piston in the fluid pressure cylinder 11. Mounted in the cross arm 5 are the pins 8. These pins are rigidly secured in place and do not move with the piston 7 but pass through close fitting bores therein. The number and position of the pins 8 depends upon the number of bores and their position which it is desired to form in the finished product. At 12 is a vertically movable piston which fits snugly into the recess 2. It is pointed out here that the cross-sectional shape of piston 7, recess 2 and piston 12 depends upon the desired shape of the finished article. Piston 12 has bores 13 therethrough in alignment with the pins 8. This piston 12 is connected by piston rod 14 to the piston of the fluid pressure cylinder 15. The apparatus may be modified as shown in Fig. 3 so as to eliminate the frame 9. The piston 14 in this case corresponding to the previously described piston 7 is formed integral with the piston rod 10 of reduced diameter. Piston rod 10 passes through a hole in the lower transverse arm 4.

The material to be molded prepared in accordance with any of the above disclosed processes is filled into the recess 2 to the proper depth. It will be noted that piston 7 in the position shown is limited in its downward movement by the transverse arm 5 and, hence, forms a head against which the material may be pressed. With a sufficient quantity of material in recess 2 plunger 12 is moved downwardly first engaging pins 8 so that they pass into the bores 13. The piston then enters recess 2 entrapping the powder between it and the lower fixed piston 7. The materials are then compressed with sufficient pressure to form a self-sustaining coherent body. During the pressure operations it will be noted that the pins 8 are held in the proper position by reason of the fact that they pass through both pistons 7 and 12. After piston 12 is withdrawn piston 7 may be operated upwardly to eject the formed product from the recess and to strip it from the pins 8. The body thus formed will have longitudinal bores therethrough at the places where the pins 8 were located. This body is sufficiently self-sustaining so that it may be handled for heat processing. The bodies are then fired at the proper temperature and the proper time depending upon the materials used to produce a hard ceramic body. The mixtures employing talc will produce a relatively soft, less vitrified body. The finished body in the cases where the basic material has been preheated will not be subject to excessive shrinking when in use at high temperatures. Bodies formed from mixtures using a low temperature binder will be treated for a shorter period at lower temperatures.

It is pointed out here that instead of mixing the materials in a vacuum as described above they can be mixed in the air and then compressed in a vacuum either being vacuumized before compression or during the compression operation.

From the aforegoing disclosure it will be apparent that this invention resides in certain principles of construction and procedure which may be effected in other ways without departing from these principles. I do not, therefore, desire to be strictly limited to the disclosure as given for purposes of illustration but rather to the scope of the appended claims.

What I seek to secure by United States Letters Patent is:

1. A ceramic body of the type described comprising a pressure formed and heat treated mixture of magnesia oxide, talc and a non-crystalline fat dehydrate.

2. A ceramic body of the type described comprising a pressure formed and heat treated mixture of magnesia oxide, talc and stearic acid.

3. A ceramic body comprising a pressure formed and heat treated mixture of powdered magnesia oxide and lead borate.

4. A ceramic body comprising a pressure formed and heat treated mixture of powdered magnesia oxide and lead acetate.

5. A ceramic body comprising a pressure formed and heat treated mixture of precipitated magnesia, talc and an agglomerant.

6. A ceramic body comprising a pressure formed and heat treated mixture of precipitated magnesia, talc and a low temperature melting binder.

7. The method of preparing a moldable powder which comprises mixing a metal or its oxide in the form of powder with a binder and a liquid carrier in a vacuum and drying the mixture.

8. The method of molding ceramic bodies which comprises mixing a powdered metal or its oxide with talc in water, drying the mixture, adding a dehydrating noncrystalline fat to the mixture and molding the mixture under pressure.

9. A ceramic body comprising a pressure formed and heat treated mixture of magnesia talc and cuprous chloride.

In testimony whereof I have hereunto set my hand on this sixth day of April, A. D. 1931.

HENRY L. CROWLEY.